US006773811B2

(12) United States Patent
Ferguson et al.

(10) Patent No.: US 6,773,811 B2
(45) Date of Patent: Aug. 10, 2004

(54) TREATMENT FOR SUBSTRATES

(75) Inventors: Paul Ferguson, Bebington (GB); Paul Hugh Findlay, Bebington (GB); Christopher Clarkson Jones, Bebington (GB); Dax Kukulj, Wirral (AU)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 74 days.

(21) Appl. No.: 10/210,153

(22) Filed: Aug. 1, 2002

(65) Prior Publication Data

US 2003/0068495 A1 Apr. 10, 2003

(30) Foreign Application Priority Data

Aug. 1, 2001 (EP) ........................................... 01306632

(51) Int. Cl.[7] ....................... D06M 15/03; D06M 15/05; C11D 3/22; C11D 3/37; B32B 23/00

(52) U.S. Cl. ....................... 428/402; 428/403; 428/326; 106/162.1; 106/162.7; 106/162.71; 106/162.8; 106/163.01; 106/168.01; 106/170.4; 106/172.1; 106/187.1; 252/8.81; 252/8.86; 252/8.91; 510/470; 510/471; 510/472; 510/473

(58) Field of Search ................................ 428/323, 532; 510/470, 471, 473, 461; 106/162.1, 162.7, 162.71, 162.8, 163.01, 168.01; 252/8.81

(56) References Cited

U.S. PATENT DOCUMENTS 6,225,462 B1 * 5/2001 Berry et al. ............. 536/123.1
6,384,011 B1 * 5/2002 Leupin et al. .............. 510/473

FOREIGN PATENT DOCUMENTS

| | | | |
|---|---|---|---|
| DE | 38 34416 A1 | | 4/1990 |
| WO | WO 99/14295 | * | 3/1999 |
| WO | 00/18861 | | 4/2000 |

* cited by examiner

*Primary Examiner*—Vivian Chen
(74) *Attorney, Agent, or Firm*—Alan Bornstein

(57) ABSTRACT

A water-dispersible particle wherein the material comprises (i) one or more polymeric deposition materials having an average repeat unit (I):

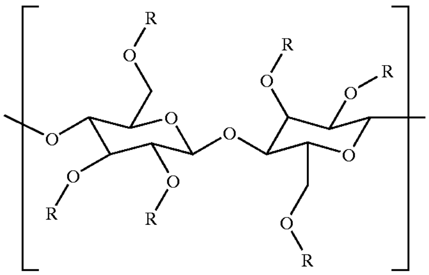

(I)

wherein at least one or more R groups of the polymer are independently selected from H, a hydrolysable group or a linker group in which when R is a hydrolysable group the degree of substitution is 0 to 3 and when R is a linker group the degree of substitution is 0.01 to 3;

(ii) a benefit agent attached to the deposition enhancing part;

characterised in that the water-dispersible particle has a particle size from 20 to 5,000 nm.

14 Claims, No Drawings

TREATMENT FOR SUBSTRATES

TECHNICAL FIELD

The present invention relates to a material comprising a benefit agent and a deposition aid for deposition of the benefit agent onto a substrate. It further relates to a method of depositing a benefit agent from a dispersion onto a substrate.

BACKGROUND OF THE INVENTION

Conventionally the deposition of the benefit agent from a treatment composition depends upon the attractive forces between the oppositely charged substrate and the benefit agent. Such adverse charge considerations can place severe limitations upon the inclusion of benefit agents in compositions where an active component thereof is of an opposite charge to that of the benefit agent. For example, cotton is negatively charged and thus requires a positively charged benefit agent in order for the benefit agent to be substantive to the cotton, i.e. to have an affinity for the cotton so as to absorb onto it. Often the substantivity of the benefit agent is reduced and/or the deposition rate of the material is reduced because of the presence of incompatible charged species in the compositions.

Alternatively, when deposition of a conventional benefit agent is effected by mechanisms that do not rely upon charge interaction but upon other non-covalent forces, for example soil release polymers, other problems may occur, namely where interaction of an anionic surfactant with the benefit agent can also make the material so negatively charged and/or soluble as to overcome the other attractive interactions.

Furthermore, there is frequently another complication in achieving optimum deposition of a benefit agent onto a substrate, in that, the need for solubility of the benefit agent in the medium used to treat the substrate is in principle, incompatible with the requirement for the benefit agent to deposit/adsorb onto the substrate.

WO 00/18861 describes a water soluble or water dispersable polysaccharide based rebuild agent for deposition onto fabric during a treatment process wherein a benefit agent is attached to the rebuild agent. However the significance of the particle size for deposition has not been recognised by this document The present invention is directed towards materials for solving one or more of the above problems.

DEFINITION OF THE INVENTION

Accordingly, a first aspect of the present invention provides water-dispersible particle wherein the material comprises:

i) one or more polymeric materials having an average repeat unit (I):

(I)

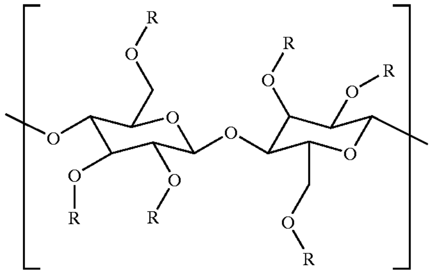

wherein at least one or more R groups of the polymer are independently selected from H, a hydrolysable group or a linker group in which when R is a hydrolysable group the degree of substitution is 0 to 3 and when R is a linker group the degree of substitution is 0.01 to 3;

(ii) a benefit agent attached to the deposition enhancing part;

characterised in that the particle has a particle size from 20 to 5,000 nm

By water-dispersible, as used herein, what is meant is that the material forms a finely divided suspension on addition to water or another aqueous solution A second aspect of the present invention also provides a method of depositing a benefit agent onto a substrate by applying said material to the substrate.

A third aspect of the present invention also provides compositions comprising a material according to the first aspect of the present invention.

DETAILED DESCRIPTION OF THE INVENTION

The Material-Deposition Enhancing Part

The deposition enhancing part of the material comprises:

ii) one or more depositing polymeric materials having an average repeat unit (I):

(I)

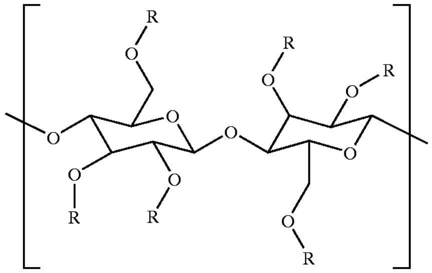

wherein at least one or more R groups of the polymer are independently selected from H, a hydrolysable group or a linker group in which when R is a hydrolysable group the degree of substitution is 0 to 3 and when R is a linker group the degree of substitution is 0.01 to 3;

Deposition onto a substrate includes deposition by adsorption, co-crystallisation, entrapment and/or adhesion.

The deposition enhancing part has a polymeric backbone and is attached to the benefit agent. Attachment can be via a hydrolytically stable bond or the benefit agent may be physically impregnated inside particles, which contain the deposition enhancing part.

The polymeric backbone is chosen to have an affinity for the substrate onto which it is to be deposited. It is especially preferred that the polymeric backbone is of a similar chemical composition to the substrate onto which it is to be deposited.

For example, it the fabric is cellulosic in nature, e.g. cotton, the polymeric backbone is preferably cellulose or a cellulose derivative or a another β-1,4-linked polysaccharide having an affinity for cellulose, such as mannan and glucomannan.

The polysaccharide may be straight or branched. Many naturally occurring polysaccharides have at least some degree of branching, or at any rate, at least some saccharide rings are in the form of pendant side groups on a main polysaccharide backbone.

The average degree of substitution of these pendant groups which undergo the chemical charge is preferably from 0.1 to 3 (e.g. from 0.3 to 3), more preferably from 0.1 to 1 (e.g. from 0.3 to 1).

The polysaccharide may be straight or branched. Many naturally occurring polysaccharides have at least some degree of branching, or at any rate at least some saccharide rings are in the form of pendant side groups (which are therefore not in themselves counted in the degree of substitution) on a main polysaccharide backbone.

A polysaccharide comprises a plurality of saccharide rings which have pendant hydroxyl groups. The pendant groups can be bonded chemically or by other bonding mechanism, to these hydroxyl groups by any means described hereinbelow. The "average degree of substitution" means the average number of pendant groups per saccharide ring for the totality of polysaccharide molecules in the sample and is determined for all saccharide rings whether they form part of a linear backbone or are themselves, pendant side groups in the polysaccharide.

Preferred hydrolysable or linker groups are preferabley selected from one or more of acetate, propanoate, trifluroacetate, 2-(2-hydroxy-1-oxopropoxy) propanoate, lactate, glycolate, pyruvate, crotonate, isovalerate cinnamate, formate, salicylate, carbamate, methylcarbamate, benzoate, gluconate, methanesulphonate, toluene, sulphonate, groups and hemiester groups of fumaric, malonic, itaconic, oxalic, maleic, succinic, tartaric, aspartic, glutamic, and malic acids.

It is prefererable if the hydrolysable group(s) is/are selected from carboxylic acid esters.

It is advantageous it the linker group(s) is/are selected from amines, methacrylates, acrylates, thiols or mixtures thereof.

Particularly preferred such groups are the monoacetate, hemisuccinate, and 2-(2-hydroxy-1-oxopropoxy) propanoate. The term "monoacetate" is used herein to denote those acetates with the degree of substitution of 1 or less on a cellulose or other β-1,4 polysaccharide backbone The molecular weight of the deposition enhancing part of the particle may typically be in the range of 1,000 to 50,000 000, more preferably 10,000 to 500,000.

The Material—Benefit Agent Groups

The benefit agent groups may be selected from any groups which is used to impart desirable properties to the substrate upon which the material of the present invention is to be deposited. The benefit agent group may be, in particular, one which imparts a desirable property to a fabric, household surface, dish or cutlery surface, skin, hair, teeth or nail substrate, especially to a fabric substrate. In practice, a material according to the present invention may comprise two or more benefit agent groups on the same particle, either of the same kind or of different kinds.

For hydrophobic benefit agents groups, the deposition enhancing part should be sufficient to make the material water dispersible.

The material of the present invention must comprise at least one deposition enhancing moiety and at least one benefit agent moiety. However, dependent upon the nature of each moiety, the weight ratio of deposition aid moiety to benefit agent moiety is preferably from 1:1 to 1:10,000, more preferably from 1:5 to 1:5,000 and most preferably from 1:10 to 1:500.

According to the benefit agent type(s), the material of the present invention may, for example be incorporated in liquid or solid fabric treatment compositions, laundry (wash) compositions, household cleaning compositions, hand and machine dishwashing compositions, or personal care compositions.

It is especially preferred if the benefit agent gives a perceivable benefit to a fabric.

The present invention is of particular use when the composition is used in laundering fabrics and in this context a benefit agent can be defined as any agent which affects the feel, appearance, or the perception of a fabric. For this application, preferred benefit agent groups may be selected from the following:

(a) fabric softening and/or conditioning agents;

(b) lubricants for inhibition of fibre damage and/or for colour care and/or for crease reduction and/or for ease of ironing;

(c) UV absorbers such as fluorescers and photofading inhibitors, for example sunscreens/UV inhibitors and/or anti-oxidants;

(d) fungicides and/or insect repellents;

(e) drape modifiers and shape retention aids; and (f) perfumes.

Suitable fabric softening and/or conditioning agent groups are preferably chosen from those of the cationic detergent active type, clays and silicones. Those of the cationic detergent active type are preferably selected from quaternary ammonium cationic molecules, for example those having a solubility in water at pH 2.5 and 20° C. of less than 10 g/l.

It is preferred for the ester-linked quaternary ammonium compounds to contain two or more ester groups. In both monoester and the diester quaternary ammonium compounds it is preferred if the ester group(s) is a linking group between the nitrogen atom and an alkyl group. The ester groups(s) are preferably attached to the nitrogen atom via another hydrocarbyl group.

As used herein the term 'ester group', when used in the context of a group in the quaternary ammonium material, includes an ester group which is a linking group in the molecule.

Typical are quaternary ammonium compounds containing at least one ester group, preferably two, wherein at least one higher molecular weight group containing at least one ester group and two or three lower molecular weight groups are linked to a common nitrogen atom to produce a cation and wherein the electrically balancing anion is a halide, acetate or lower alkosulphate ion, such as chloride or methosulphate. The higher molecular weight substituent on the nitrogen is preferably a higher alkyl group, containing 12 to 28, preferably 12 to 22, e.g. 12 to 20 carbon atoms, such as coco-alkyl, tallowalkyl, hydrogenated tallowalkyl or substituted higher alkyl, and the lower molecular weight substituents are preferably lower alkyl of 1 to 4 carbon atoms, such as methyl or ethyl, or substituted lower alkyl. One or more of the said lower molecular weight substituents may include an aryl moiety or may be replaced by an aryl, such as benzyl, phenyl or other suitable substituents.

More preferably, the quaternary ammonium material comprises a compound having two long chain alkyl or alkenyl chains with an average chain length equal to or greater than $C_{14}$. Even more preferably each chain has an average chain length equal to or greater than $C_{16}$. Most preferably at least 50% of each long chain alkyl or alkenyl group has a chain length of $C_{18}$. It is preferred if the long chain alkyl or alkenyl groups are predominantly linear.

It is particularly advantageous if the cationic softening compound is a quaternary ammonium compound with two $C_{12}$–$C_{22}$ alkyl or alkenyl groups connected to a quaternary ammonium group via at least one ester link, preferably two ester links, or else a compound with a single long chain with an average chain length greater than or equal to $C_{23}$. Examples of cationic softeners are described in U.S. Pat. No. 4,137,180 and WO-A-93/23510.

The most preferred type of ester-linked quaternary ammonium material that can be used as benefit agent group(s) is represented by the formula (A):

(A)

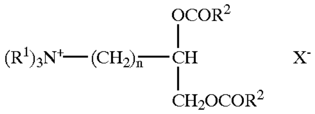

wherein $R^1$, n, $R^2$ and $X^-$ are as defined above.

It is advantageous for environmental reasons if the quaternary ammonium material is biologically degradable.

Preferred materials of this class such as 1,2 bis[hardened tallowoyloxy]-3-trimethylammonium propane chloride and their method of preparation are, for example, described in U.S. Pat. No. 4,137,180. Preferably these materials comprise small amounts of the corresponding monoester as described in U.S. Pat. No. 4,137,180 for example 1-hardened tallowoyloxy-2-hydroxy-3-trimethylammonium propane chloride.

Another class of preferred ester-linked quaternary ammonium materials for use as benefit agent group(s) can be represented by the formula:

(B)

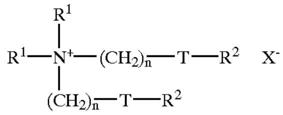

wherein each $R^1$ group is independently selected from $C_{1-4}$alkyl, hydroxyalkyl or $C_{2-4}$ alkenyl groups; and wherein each $R^2$ group is independently selected from $C_{8-28}$ alkyl or alkenyl groups; $X^-$ is any suitable counter-ion, i.e. a halide, acetate or lower alkosulphate ion, such as chloride or methosulphate.

T is 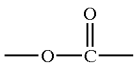 or 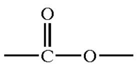 ; and n is an integer from 1–5 or is 0

It is especially preferred that each $R^1$ group is methyl and each n is 2.

Of the compounds of formula (B), Di-(tallowyloxyethyl)-dimethyl ammonium chloride, available from Hoechst, is the most preferred Di-(hardened tallowyloxyethyl)dimethyl ammonium chloride, ex Hoechst and di-(tallowyloxyethyl)-methyl hydroxyethyl methosulphate are also preferred.

Another preferred closes of quaternary ammonium cationic fabric softening agent for use as the benefit agent group(s)is defined by formula (C):

(C)

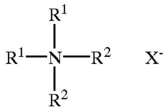

where $R^1$, $R^2$ and X are as hereinbefore defined.

A preferred material of formula (C) is di-hardened tallow-diethyl ammonium chloride, sold under the Trademark Arquad 2HT.

It is also possible to use certain mono-alkyl cationic surfactants which on their own can be used in main-wash compositions for fabrics. Cationic surfactants that may be used include quaternary ammonium salts of the general formula $R_1R_2R_3R_4N^+ X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

If the fabric softening and/or conditioning group(s) is/are silicones, these may for example be selected from those disclosed in GB-A-1 549 180, EP-A-459 821 and EP-A-459 822. However, these silicones if used for other benefits listed under the class (b) above, can be regarded as “lubricants”. Other suitable lubricants include any of those known for use as dye bath lubricants in the textile industry.

Suitable photofading inhibitors of the sunscreen/UV inhibitor type are preferably molecules with an extinction co-efficient greater than 2000 l $mol^{-1}$ $cm^{-1}$ at a wavelength of maximal absorption. Typically for a sunscreen maximal absorption occurs at wavelengths of 290–370 nm, more usually 310–350 nm, especially 330–350 nm.

Examples of suitable sunscreens are given in *Cosmetic Science and Technology Series*, Vol. 15; Sunscreens; 2nd edition; edited by Lowe, Shoath and Pathak; *Cosmetics and Toiletries*; Vol. 102; March 1987; pages 21–39; and *Evolution of Modern Sunscreen Chemicals*; pages 3–35 both by N. A. Saarth.

In particular, suitable sunscreens include carboxylic acids or carboxylic acid derivatives, for example acrylates, cinnamates and benzoates or derivatives thereof, such as 4-methoxy cinnamate salicylates, PABA, 4-acetoxy benzoate dibenzoylmethanes, phenyl benzoimidazoles, aminobenzoates, benzotriazoles and benzophenones.

Suitable photofading inhibitors of the anti-oxidant type include benzofurans, coumeric acids or derivatives thereof, for example 2-carboxy benzofuran and bis(p-amine sulphonates) triazine, DABCO derivatives, tocopherol derivatives, tertiary amines and aromatic substituted alcohols eg butylated hydroxytoluene (BET), Vitamin C (ascorbic acid) and vitamin E.

Suitable fungicides include 6-acetoxy-2,4-dimethyl-m-dioxane, diiodomethyl-p-tolysulphone, 4,4-dimethyloxaolidine, hexahydro-1,3,5-tris(2-hydroxyethyl)-s-triazine, sodium dimethyldithiocarbamate, sodium 2-rnercaptobenzothioazole, zinc dimethyldithiocarbamate, zinc 2-mercaptobenzothiazole, sodium 2-pyridinethiol-1-oxide, sodium 2-pyridinethiol-1-oxide and N-trichloromethylthio-4-cyclohexene-1,2-dicarboximide.

Suitable insect repellents include N-alkyl neoalkanamides wherein the alkyl is of 1 to 4 carbon atoms and the neoalkanoyl moiety is of 7 to 14 carbon atoms preferably N-methyl neodecanamide; N,N-diethyl meta toluamide (DEET), 2-Hydroxyethyl-n-octyl sulphide (MGK 874); N-Octyl bicycloheptene dicarboximide (MGK 264); hexahydrodibenzofuran (MGK 11), Di-n-propyl isocinchomerate (MGK 326); 2-Ethyl-1,3-hexanediol, 2-(n-butyl)-2-ethyl-1,3-propanediol, dimethyl phthalate, dibutyl succinate, piperonyl butoxide, pyrethrum, Cornmint, Peppermint, American spearmint, Scotch spearmint, Lemon oil, Citronella, cedarwood oil, pine oil, Limonene, carvone, Eucalyptol, Linalool, Gum Camphor, terpineol and fencholic acid.

Suitable perfumes are commercially available and have an undisclosed molecular structure.

Suitable clays include a three layered smectite clay, preferably having a cation exchange capacity as described in GB1400898 (Procter and Gamble). Especially preferred are clays which are 2:1 layer phyllosilicates possessing a lattice charge deficiency in the range of 0.2 to 0.4 g equivalents per half unit cell as described in EP 0 350 288 (Unilever) .

Latex materials are also defined as benefit agents. A latex is defined as a material suitable for improving the drape of fabric, suitable materials include a polyvinylacetate homopolymer such as 9802 (Vinamul).

Benefit agent may also include resins such as Knittex BE (Ciba-Geigy) or silicas such as Crosanaol NS (Crosfield), these Benefit Agents prevent pill formation on the fabric.

The benefit agent may be any material which is encapsulated. Suitable encapsulating materials include starches and poly(vinylacetate) and urea/formaldehyde condensate based materials.

Suitable materials that may be encapsulated include perfumes, insect repellents, fungicides, or photo protective agents.

The benefit agent is attached to the deposition enhancing part. This attachment may be by adsorption or by chemical bonding. If the Benefit Agent is adsorbed this is preferably by simple physisorption.

If the benefit agent is attached to the deposition enhancing part this may be via a linking agent. However, direct chemical bonding may also be used, as described in more detail hereinbelow.

The benefit agent is attached to the deposition particle either directly or indirectly. A indirect attachment included encapsulation of the benefit agent and attachment of the encapsulation material to the deposition particle. Preferably the benefit agent is attached to benefit agent by means of a hydroltically stable bond.

Suitable linking agents are molecules which show a high affinity for the Benefit Agent. It is preferred if the linking agent is covalently attached to the backbone of the deposition enhancing part. It is also advantageous if the linking agent is covalently bound to the benefit agent.

Other Substituents

As well as the benefit agent groups and any pendant groups which undergo a chemical change to enhance deposition, pendant groups of other types may optionally be present, i.e. groups which do not confer a benefit and which do not undergo a chemical change to enhance substrate affinity. Within that class of other groups is the sub-class of groups for enhancing the solubility of the material (e.g. groups which are, or contain one or more free carboxylic acid/salt and/or salphonic acid/salt and/or sulphate groups).

Examples of solubility enhancing substituents include carboxyl, sulphonyl, hydroxyl, (poly)ethyleneoxy- and/or (poly)propyleneoxy-containing groups, as well as amine groups.

The other pendant groups preferably comprise from 0% to 65%, more preferably from 0% to 10% of the total number of pendant groups. The water-solubilising groups could comprise from 0% to 100% of those other groups but preferably from 0% to 20%, more preferably from 0% to 10%, still more preferably from 0% to 5% of the total number of other pendant groups.

The particle (deposition part and benefit part) has a particle size from 20 to 5,000 nm, more preferably from 50 to 2,000 nm, most preferably from 100 to 1,000 nm.

Particle size may be measured by any means known to the skilled person. A particularly preferred way of measuring $D_{3,2}$ average particle size is by a laser light scattering technique, using a 2600D Particle Sizer from Malvern Instruments.

Synthetic Routes

There are basically two general methods for preparing water dispersable material of the class comprising a deposition aid including or having attached thereto,; these methods are disclosed in WO 00/18861.

Compositions

The material according to the first aspect of the present invention may be incorporated into compositions containing only a diluent (which may comprise solid and/or liquid) and/or also comprising an active ingredient. The compound is typically included in said compositions at levels of from 0.01% to 25% by weight, preferably from 0.05% to 10%, most preferably from 0.2% to 5%.

The active ingredient in the compositions is preferably a surface active agent or a fabric conditioning agent. More than one active ingredient may be included. For some applications a mixture of active ingredients may be used.

The compositions of the invention may be in any physical form e.g. a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and rinse-added fabric softening compositions may include surface-active compounds, particularly non-ionic surface-active compounds, if appropriate.

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds.

The compositions of the invention may contain linear alkylbenzene sulphonate, particularly linear alkylbenzene sulphonates having an alkyl chain length of $C_8$–$C_{15}$. It is preferred if the level of linear alkylbenzene sulphonate is from 0 wt % to 30 wt %, more preferably 1 wt % to 25 wt %, most preferably from 2 wt % to 15 wt %.

The compositions of the invention may contain other anionic surfactants in amounts additional to the percentages quoted above. Suitable anionic surfactants are well-known to those skilled in the art. Examples include primary and secondary alkyl sulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the intention may also contain non-ionic surfactant. Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

It is preferred if the level of non-ionic surfactant is from 0 wt % to 30 wt %, preferably from 1 wt % to 25 wt %, most preferably from 2 wt % to 15 wt %.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be nonionic. They may for example be used in amounts from 0.5% to 35%, preferably from 1% to 30% more preferably from 3% to 25% by weight of the composition.

Suitable fabric conditioning agents are typically any of the free compounds corresponding to examples of the materials hereinbefore described as possible fabric conditioning benefit agent groups.

The compositions of the invention, when used as main wash fabric washing compositions, will generally also contain one or more detergency builders. The total amount of detergency builder in the compositions will typically range from 5 to 80 wt %, preferably from 10 to 60 wt %.

It is also possible to include certain mono-alkyl cationic surfactants which can be used in main-wash compositions for fabrics. Cationic surfactants that may be used include quaternary ammonium salts of the general formula $R_1R_2R_3R_4N^+ X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2–60%, preferably 15–40% most preferably 25–35%.

Detergent compositions suitable for use in most automatic fabric washing machines generally contain anionic non-soap surfactant, or non-ionic surfactant, or combinations of the two in any suitable ratio, optionally together with soap.

The compositions of the invention, when used as main wash fabric washing compositions, will generally also contain one or more detergency builders. The total amount of detergency builder in the compositions will typically range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula: 0.8–1.5 $Na_2O$. $Al_2O_3$. 0.8–6 $SiO_2$ These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever) . Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N', N',-tetracetyl ethylenediamine (TAED) and sodium noanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phtalimido peroxy caproic acid (PAP). Such peracids are suitably present at 0.1–12%, preferably 0.5–10%.

A bleach stabiliser (transition metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylene diamine di-succinic acid). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s). Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilins which are obtained from particular strains of *B. Subtilis B. licheniformis*, such as the commercially available subtilisins Maxatase (Trade Mark), as supplied by Gist Brocades N.V., Delft, Holland, and Alcalase (Trade Mark), as supplied by Novo Industri A/S, Copenhagen, Denmark.

Particularly suitable is a protease obtained from a strain of Bacillus having maximum activity throughout the pH range of 8–12, being commercially available, e.g. from Novo Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; soil release polymers; inorganic salts such as sodium sulphate; lather control agents or lather boosters as appropriate; proteolytic and lipolytic enzymes; dyes; coloured speckles; perfumes; foam controllers; fluorescers and decoupling polymers. This list is not intended to be exhaustive. However, many of these ingredients will be better delivered as benefit agent groups in materials according to the first aspect of the invention.

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/l, more preferably at least 500 g/l. Especially preferred compositions have bulk densities of at least 650 g/litre, more preferably at least 700 g/litre.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Substrate

The substrate may be any substrate onto which it is desirable to deposit benefit agents and which is subjected to treatment such as a washing or rinsing process.

In particular, the substrate may be fabric or of a personal nature such as hair, skin, teeth or nails, or of a domestic nature such as dishes, ceramics, metal, plastics or upholstery.

It has been found that particular good results are achieved when using a natural fabric substrate such as cotton, or fabric blends containing cotton.

Treatment

The treatment of the substrate with the material of the invention can be made by any suitable method such as washing, soaking or rinsing of the substrate.

Typically the treatment will involve a washing or rinsing method such as treatment in the main wash or rinse cycle of a washing machine and involves contacting the substrate with an aqueous medium comprising the material of the invention.

The present invention will now be explained in more detail by reference to the following non-limiting examples

EXAMPLE 1

Amine Modified Cellulose Monoacetate

Cellulose monoacetate (CMA) with a degree of acetate substitution of 0.6 and molecular weight of 16000 (DS=0.6, mw=16 k) was prepared according to method described in WO 00/18860.

Cellulose monoacetate (DS=0.6, mw=16 k) (2.0 g) was dissolved in dimethyl acetamide (30 ml) and stirred. The solution was heated to 50° C. and carbonyl diimidazole (0.87 g) was added.

After 3 hours the solution was added dropwise to ethylene diamine (20 ml) and stirred at 25° C. for 30 min. The amine modified cellulose monoacetate polymer was isolated from the solution by precipitation into acetone (600 ml), filtering (to remove the liquid), dissolving in water, filtering (to remove any water-insoluble fraction) and then freeze-drying to give a white coloured solid.

EXAMPLE 2

Attaching the Polymer from Example 1 to Polystyrene Particles in Water

The following buffer solutions were prepared:

Buffer A: 0.02 M, pH 6, phosphate buffer

Made by mixing 0.02 M $Na_2HPO_4$ and 0.02 N $NaH_2PO_4$ to give pH=6.0.

Buffer B: 0.01 M, pH 7, phosphate buffer

Made by mixing 0.01M $Na_2HPO_4$ and 0.01 M $Na_2H_2PO_4$ to give pH=7.0

Buffer C: 0.1 M, pH 9.6, carbonate buffer

Made by mixing 0.1 M $Na_2CO_3$ and 0.1 M $NaHCO_3$ to give pH=9.6.

Polystyrene latex (ex. Polysciences Inc., carboxyl functional, fluorescent, mean diameter=0.5 μm, 2.6% solids) (1 ml) was washed via the following procedure: Firstly diluted with Buffer C (0.5 ml) and mixed (Fison Whirlimixer). The latex was centrifuged at 130000 rpm for 15 minutes, the supernatant decanted off, and the latex particles re-dispersed in Buffer B (1 ml). The latex was centrifuged at 130000 rpm for 15 minutes, the supernatant decanted off, and the latex particles re-dispersed in Buffer A (1 ml). This was repeated 2 times. The latex was centrifuged at 130000 rpm for 15 minutes, the supernatant decanted off, and the latex particles re-dispersed in ethyl dimethyl aminopropyl carbodimide solution (0.025 g in 1 ml of Buffer A) and stirred at 25° C. for 3 hours. The latex was centrifuged at 130000 rpm for 15 minutes, the supernatant decanted off, and the latex particles re-dispersed in Buffer B (1 ml). This was repeated. The latex was centrifuged at 130000 rpm for 15 minutes, the supernatant decanted off, and the latex particles re-dispersed in amine modified cellulose monoacetate (prepared in Example 1) solution (0.0138 g in 1 ml of Buffer B) and stirred at 25° C. for 18 hours. The latex was centrifuged at 130000 rpm for 15 minutes, the supernatant decanted off, and the latex particles re-dispersed in Buffer B (1 ml). This was repeated.

The procedure described above used particles with an initial size of 0.5 μm. A range of similar particles with sizes 0.1, 1 and 4.5 μM were also obtained (ex. Polysciences Inc., carboxyl functional, fluorescent, 2.6% solids). These were also modified using the same method. Except for the 0.1 μm particles which required ultra-centrifugation (60,000 RPM for 1 hour) for each separation phase to sediment particles from the liquor. They also required the addition of 4 ml of buffer at each buffer addition stage.

EXAMPLE 3

Deposition of Particles Under Model Wash Conditions

A model wash solution (pH 10.5 containing 1 g/l surfactant) was prepared by dissolving $Na_2CO_3$ (0.7546 g), $NaHCO_3$ (0.2419 g), LAS active paste (1 g, Petrelab 550, ex. Petrelab) and Symperonic A7 (0.5 g, ex. ICI) in de-ionised water (997.5 g).

Non-fluoresced cotton and polyester fabric circles (4 cm diameter) were placed in the bottom of plastic bottles. The bottle diameter was such that the fabric samples covered the base and lay flat. Model wash solution was added (36 ml) to each bottle and the original unmodified dispersion and cellulose modified variant (from example 2) were added to give concentrations of 5 and 10 ppm. Controls containing model wash solution (36 ml) and fabric circles (4 cm) were also prepared. Prior to beginning the wash a small sample was removed from each bottle (5 ml). The bottles were then agitated for 1 hour at 40° C. (shaker bath, ex. Gallenkamp), removed and the fabric circles dried on adsorbent paper towel.

This wash procedure was used for each of the different sized particle dispersions.

EXAMPLE 4

Determination of Degree of Deposition on Fabric Circles

The percentage of material deposited in example 3 was determined by fluorescence depletion i.e. measuring the loss of fluorescence of the wash liquor before and after the wash cycle. The fluorescence of the fabric itself was also measured after washing. A Perkin Elmer Luminescence Spectrophotometer was used for all fluorescence measurements and a calibration plot was used to convert fluorescence intensities into percentages of deposited materials.

The percentage depositions determined by fluorescence depletion, with respect to particle size and fabric type are shown in tables 1 and 2:

TABLE 1

On Cotton:

| | Percentage Deposition | | |
|---|---|---|---|
| Particle Size (μm) | Un-modified particles (A) | CMA modified particles (B) | CMA induced % deposition A-B) |
| 0.1 | 24.0 | 80.5 | 56.5 |
| 0.5 | 4.6 | 61.5 | 56.9 |
| 1 | 1.4 | 43.7 | 42.3 |
| 4.5 | 19.3 | 49.2 | 29.9 |

TABLE 2

On Polyester:

| | Percentage Deposition | | |
|---|---|---|---|
| Particle Size (μm) | Un-modified particles (A) | CMA modified particles (B) | CMA induced % deposition A-B) |
| 0.1 | 40.9 | 36.0 | 4.9 |
| 0.5 | 3.8 | 6.0 | 2.2 |
| 1 | 23.8 | 35.7 | 11.9 |
| 4.5 | 26.8 | 51.1 | 24.3 |

The percentage depositions determined by fluorescence measured directly from the fabric after washing, with respect to particle size for cotton are shown table 3:

TABLE 3

On Cotton:

| Particle Size (μm) | Fluorescence Intensity CMA modified particles |
|---|---|
| Control | 10.0 |
| Un-modified particles | 15.9 |
| 0.1 CMA modified | 54.1 |
| 0.5 CMA modified | 103.6 |
| 1 CMA modified | 17.5 |
| 4.5 CMA modified | 15.7 |

The tables above show that Examples according to the invention deposit at a higher level than the comparative Examples.

What is claimed is:

1. A water-dispersible particle wherein the material comprises i) one or more polymeric deposition materials having an average repeat unit (I)

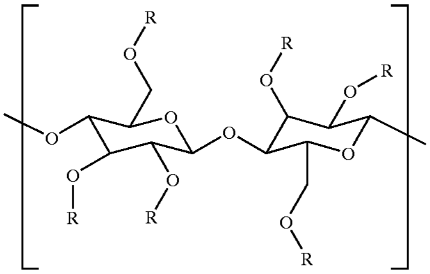

wherein at least one or more R groups of the polymer are independently selected from H, a hydrolysable group or a linker group in which when R is a hydrolysable group the degree of substitution is 0 to 3 and when R is a linker group the degree of substitution is 0.01 to 3;

(ii) a benefit agent attached to the deposition enhancing part;

characterised in that the water-dispersible particle has a particle size from 20 to 1,000 nm.

2. A water-dispersible particle according to claim 1 in which the particle has a particle size from 50 to 1,000 nm.

3. A water-dispersible particle according to claim 2 in which the particle has a particle size from 100 to 1000 nm.

4. A water-dispersible particle according to claim 1 in which the benefit agent ii) is attached to the deposition enhancing part of the particle i) by a hydrolytically stable bond.

5. A material according to claim 1 wherein the hydrolysable group(s) is/are selected from carboxylic acid esters.

6. A material according to claim 1 wherein the linker group(s) is/are selected from amines, methacrylates, acrylates, thiols or mixtures thereof.

7. A material according to claim 1 wherein the polymeric backbone comprises cellulose units or β-1,4-linked polysaccharide units.

8. A material according to claim 1 wherein the molar molecular weight of the depositing part of the polymeric material i) is from 1,000 to 50,000.

9. A material according to claim 1 wherein the benefit agent(s) is a fibre care agent.

10. A material according to claim 9, wherein the fibre care agents are selected from softening agents, lubricants, sunscreens, fluorescers, dyes, perfumes, dye fixatives, crease resist or preventative agents, water repellent agents, ironing aids, drape modifiers and shape retention aids.

11. A method of depositing a benefit agent onto a cotton by the use of a material as according to claim 1.

12. A composition comprising a material as according to claim 1 and at least one further component.

13. A composition according to claim 12, comprising from 0.01% to 25%, by weight of the water-dispersible particle.

14. A water-dispersible particle according to claim 1 in which the particle has a particle size from 20 to 500 nm.

* * * * *